(12) United States Patent
Kurai

(10) Patent No.: US 11,731,316 B2
(45) Date of Patent: Aug. 22, 2023

(54) BASE MATERIAL FOR MOLDING

(71) Applicant: Nissan Motor Co., Ltd., Yokohama (JP)

(72) Inventor: Shohei Kurai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 124 days.

(21) Appl. No.: 17/442,181

(22) PCT Filed: Mar. 26, 2019

(86) PCT No.: PCT/IB2019/000337
§ 371 (c)(1),
(2) Date: Sep. 23, 2021

(87) PCT Pub. No.: WO2020/194013
PCT Pub. Date: Oct. 1, 2020

(65) Prior Publication Data
US 2022/0176593 A1  Jun. 9, 2022

(51) Int. Cl.
*B32B 5/12* (2006.01)
*B29B 11/16* (2006.01)

(52) U.S. Cl.
CPC ............. *B29B 11/16* (2013.01); *B32B 5/12* (2013.01); *B32B 2260/023* (2013.01); *B32B 2260/046* (2013.01)

(58) Field of Classification Search
None
See application file for complete search history.

(56) References Cited

FOREIGN PATENT DOCUMENTS

| JP | 2011-121372 A | 6/2011 |
|---|---|---|
| JP | 2014-4797 A | 1/2014 |
| WO | 2019/031111 A1 | 2/2019 |

*Primary Examiner* — Alexander S Thomas
(74) *Attorney, Agent, or Firm* — Global IP Counselors, LLP

(57) ABSTRACT

A base material is provided for molding in which reinforcing fibers are oriented at three or more different orientation angles. In this base material, the reinforcing fibers oriented at one or two of the three or more orientation angles are continuous fibers, and the reinforcing fibers oriented at the other orientation angles are discontinuous fibers.

4 Claims, 7 Drawing Sheets

| | 0° | 45° | 90° | −45° | PATTERN ELEMENT | | | |
|---|---|---|---|---|---|---|---|---|
| PATTERN P1 | CF | CF | DF | DF | | | | |
| PATTERN P2 | CF | DF | CF | DF | | | | |
| PATTERN P3 | CF | DF | DF | CF | | | | |
| PATTERN P4 | DF | CF | CF | DF | | | | |
| PATTERN P5 | DF | CF | DF | CF | | | | |
| PATTERN P6 | DF | DF | CF | CF | | | | |
| PATTERN P7 | CF | DF | DF | DF | | | | |
| PATTERN P8 | DF | CF | DF | DF | | | | |
| PATTERN P9 | DF | DF | CF | DF | | | | |
| PATTERN P10 | DF | DF | DF | CF | | | | |

FIG. 5

| | 0° | 60° | −60° | PATTERN ELEMENT |
|---|---|---|---|---|
| PATTERN P11 | CF | CF | DF |  |
| PATTERN P12 | CF | DF | CF |  |
| PATTERN P13 | DF | CF | CF |  |
| PATTERN P14 | CF | DF | DF |  |
| PATTERN P15 | DF | CF | DF |  |
| PATTERN P16 | DF | DF | CF |  |

BASE MATERIAL FOR MOLDING

CROSS-REFERENCE TO RELATED APPLICATIONS

This application is a U.S. national stage application of International Application No. PCT/IB2019/000337, filed on Mar. 26, 2019.

BACKGROUND

Technical Field

The present invention relates to a base material for molding.

Background Information

Japanese Laid-Open Patent Application No. 2014-4797 discloses a composite material for molding. This composite material for molding is formed by laminating and integrating a skin layer and a core layer. The skin layer is integrally formed from a thermoplastic resin material that becomes the matrix resin by the planar alignment of long fibers that become reinforcing fibers. The core layer is integrally formed from a thermoplastic resin material that becomes a matrix resin by the planar distribution of short fibers.

SUMMARY

When a base material obtained by impregnating reinforcing fibers that are two-dimensionally oriented with resin is shaped into a three-dimensional form, at least a portion of the base material is subjected to shearing deformation in a plane parallel to the orientation of the reinforcing fibers. In this deformed portion, a larger compressive force or tensile force is generated in reinforcing fibers that are oriented in the principle stress direction of the plane, or in a direction close thereto, compared to reinforcing fibers that are oriented in other directions. When the amount of shearing deformation exceeds a certain limit, there is the possibility that the reinforcing fibers will buckle due to the aforementioned compressive force, or that wrinkles will appear on the surface of the base material due to the aforementioned tensile force, thereby deteriorating the appearance of the molded article.

An object of the present invention is to provide a base material for molding that can suppress the deterioration of the appearance of the molded article.

One aspect of the present invention is a base material for molding in which reinforcing fibers are oriented at three or more different orientation angles. In this base material, reinforcing fibers oriented at one or two of the aforementioned three or more orientation angles are continuous fibers, and the reinforcing fiber oriented at the other orientation angles are discontinuous fibers.

By means of the base material for molding described above, it is possible to suppress the deterioration of the appearance of the molded article.

BRIEF DESCRIPTION OF THE DRAWINGS

Referring now to the attached drawings which form a part of this original disclosure.

FIG. 5 is a diagram showing pattern elements of the first embodiment and modified examples thereof.

DETAILED DESCRIPTION OF EMBODIMENTS

Base materials for molding according to several embodiments will be described below with reference to the drawings.

First Embodiment

A base material for molding M1 according to the first embodiment includes two-dimensionally oriented reinforcing fibers F and a resin R with which the reinforcing fibers F are impregnated. The base material M1 is molded by means of a known molding method corresponding to the type of the resin R to be used, such as a heat-press method, an autoclave method, or a thermoforming method, in order to be molded into a molded article having a desired three-dimensional shape.

Figure 1:
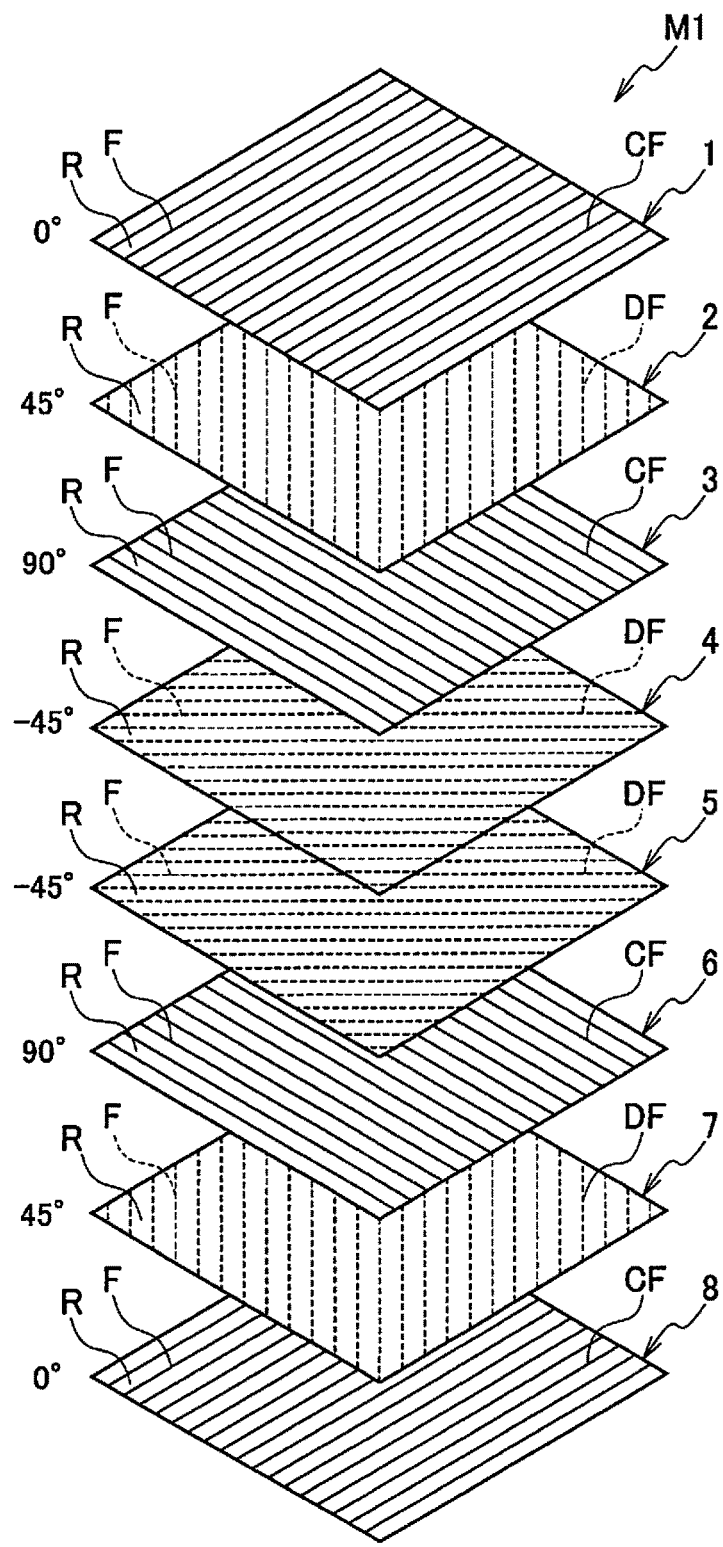
FIG. 1 is an exploded perspective view of a base material for molding according to a first embodiment.

As shown in FIG. 1, the base material M1 can be formed by laminating, for example, eight prepregs, 1-8. Each of the prepregs 1-8 is a sheet-shaped composite material obtained by impregnating the reinforcing fibers F, which are aligned in one direction and arranged essentially parallel to each other, with the resin R as matrix material. The thickness of each of the prepregs 1-8 is not particularly limited, but is approximately 0.2 mm to 0.4 mm, for example.

The reinforcing fibers F in the prepregs 1-8 extend in a direction perpendicular to the stacking direction of the prepregs 1-8, that is, a direction perpendicular to the thickness direction of the base material M1 (hereinafter also referred to as the planar direction). The type of the reinforcing fibers F is not particularly limited; for example, carbon fibers, glass fibers, polyamide fibers, alumina fibers, silicon carbide fibers, boron fibers, and carborundum fibers can be used. For example, polyacrylonitrile (PAN type), pitch type, cellulose type, carbon fibers from vapor phase-hydrocarbons, graphite fibers, etc., may be used as the carbon fibers. Two or more types of these fibers may be used in combination as well. The fineness, quantity, strength, elastic modulus, etc., of the reinforcing fibers F are not particularly limited. The volume content of the reinforcing fibers F in each of the prepregs 1-8 is not particularly limited, but may be set to, for example, 30% to 80%, so as to secure an appropriate state of impregnation of the resin R while suppressing the excessive flow of reinforcing fibers F during molding.

The resin R as the matrix material is not particularly limited; for example, known thermosetting resins and thermoplastic resins, such as epoxy resin, phenol resin, unsaturated polyester resin, vinyl ester resin, polyimide resin, polycarbonate resin, polyamide resin, and polyphenylene sulfide (PPS) resin can be used.

The method for preparing the prepregs 1-8 is not particularly limited, and a known method can be employed in accordance with the type, etc., of the resin R to be used. For example, if the resin R is a thermosetting resin, it is possible to use a hot melt method in which a thermosetting resin film is laminated and molded on a sheet-shaped fiber base material, or a solvent method in which a thermosetting resin is made into a varnish using an appropriate solvent and the fiber base material is impregnated therewith. In addition, if the resin R is a thermoplastic resin, it is possible to use a hot melt method, a solvent method, a powder method, a resin film impregnation method, a commingle method, etc.

As shown in FIG. 1, the eight prepregs 1-8 are laminated such that the reinforcing fibers F in the prepregs 1-8 are oriented at four different orientation angles. For example, the prepregs 1-8 can be laminated such that the reinforcing fibers F are oriented at orientation angles of 0°/45°/90°/−45°/−45°/90°/45°/0°, in order from the top in FIG. 1, so that the molded article obtained from the base material M1 has isotropic strength in the planar direction.

The "orientation angle" is the angle of the orientation direction of the reinforcing fibers F as seen from the thickness direction. That is, when the angle of the direction of a certain orientation of the reinforcing fibers F is set to 0°, it is the angle formed by the orientation direction of the target reinforcing fibers F with respect to this reference. When viewed from the front side of the base material M1 (upper side of FIG. 1), the counterclockwise direction with respect to the reference orientation direction is regarded as positive, and thus the angles should be greater than −90° and less than or equal to 90°.

Further, a state in which the reinforcing fibers F are "oriented at a certain orientation angle" is a state in which a fiber orientation parameter fp of the reinforcing fibers F is greater than or equal to 0.95. The fiber orientation parameter fp is a parameter that represents the orientation state of the reinforcing fibers F: fp=1.0 means that the reinforcing fibers F are oriented parallel to a reference line, described further below; and fp=0.0 means that the reinforcing fibers F are oriented completely randomly.

The fiber orientation parameter fp can be obtained by means of the following method. First, a surface that is parallel to the planar direction including the reinforcing fibers F to be evaluated is cut out from the base material M1. This surface is then viewed through an optical microscope, etc., and the angles θi of all of the reinforcing fibers F (number of fibers: N) that can be visually recognized within a prescribed measurement region with respect to the reference line are measured. Here, the angles θi are positive in the counterclockwise direction with respect to the reference line, and are greater than −90° and less than or equal to 90°.

Next, the obtained angles θi are substituted into the following equation (1).

$$fp = 2 \times \sum (\cos^2 \theta i / N) - 1 \qquad \text{Equation (1)}$$

where i=1 to N

The direction of the reference line is selected such that the fiber orientation parameter fp of the reinforcing fibers F within a prescribed measurement region to be evaluated is given the maximum value. The selected direction is defined as the orientation direction of the reinforcing fibers F to be evaluated.

As shown in FIG. 1, in the present embodiment, of the four orientation angles, the reinforcing fibers F oriented at the orientation angles of 0°/90° are continuous fibers CF (the difference between the orientation angles of continuous fibers CF oriented at two orientation angles is 90°). In addition, of the four orientation angles, the reinforcing fibers F oriented at orientation angles other than 0°/90°, i.e., at 45°/−45°, are discontinuous fibers DF. The broken lines in FIG. 1 represent the discontinuous fibers DF, whereas the solid lines represent the continuous fibers CF.

Here, "continuous fibers CF" are fibers in which the average fiber length of filaments constituting the reinforcing fibers F is 500 mm or more, and "discontinuous fibers DF" are fibers in which the average fiber length of filaments that constitute the reinforcing fibers F is greater than or equal to 10 mm and less than 500 mm. The average fiber length is a value obtained by dividing the sum of the squares of the fiber lengths of the filaments constituting the reinforcing fibers F by the sum of the fiber lengths of the filaments. The fiber length of the filaments can be measured by viewing the length of each of the filaments through an optical microscope, etc. The average fiber length of the filaments of the discontinuous fibers DF according to the present embodiment is preferably set to 10 mm or more and 200 mm or less. It is preferably 15 mm or more and 100 mm or less, and more preferably 20 mm or more and 100 mm or less. By setting the average fiber length of the discontinuous fibers DF within the range described above, it is possible to improve the strength of the molded article while maintaining excellent shaping properties of the base material M1.

The reinforcing fibers F that are the discontinuous fibers DF may be aligned in a direction corresponding to each of the orientation angles and form, together with the resin R, a layer that does not intersect the reinforcing fibers F that are the continuous fibers CF. For example, as shown in FIG. 1, the discontinuous fibers DF in the prepregs 2, 4, 5, 7 of the second, fourth, fifth, and seventh layers may form a layer that does not intersect the continuous fibers CF in the prepregs 1, 3, 6, 8 of the first, third, sixth, and eighth layers. In addition, the reinforcing fibers F that are the discontinuous fibers DF oriented at mutually different orientation angles may each form a different layer. For example, as shown in FIG. 1, the reinforcing fibers F that are the discontinuous fibers DF in the prepregs 2, 7 of the second, and seventh layers may form a layer that is different from the reinforcing fibers F that are the discontinuous fibers DF in the prepregs 4, 5 in the fourth and fifth layers.

The discontinuous fibers DF oriented at a certain orientation angle can be obtained by means of the following methods, for example. One example is a method in which a knife blade is pressed against, or laser light is irradiated upon, a one-direction prepreg obtained by impregnating the continuous fibers CF aligned in one direction with the resin R, to form cuts at an angles that intersect the fibers, and separating the continuous fibers CF. It is thereby possible to obtain discontinuous fibers DF that are aligned in one direction and that are essentially arranged parallel to each other. The length of each cut and the interval between cuts can be appropriately set in accordance with the required fiber length, etc., of the discontinuous fibers DF. Another example is a method in which a composition containing the resin R and the discontinuous fibers DF, the fiber lengths of which have been adjusted in advance, are extruded in a plastic region and pressure-molded into the form of a sheet, thereby obtaining a prepreg in which the discontinuous fibers DF are oriented in a certain direction.

The action and effect of the present embodiment will be described below.

Figure 2:
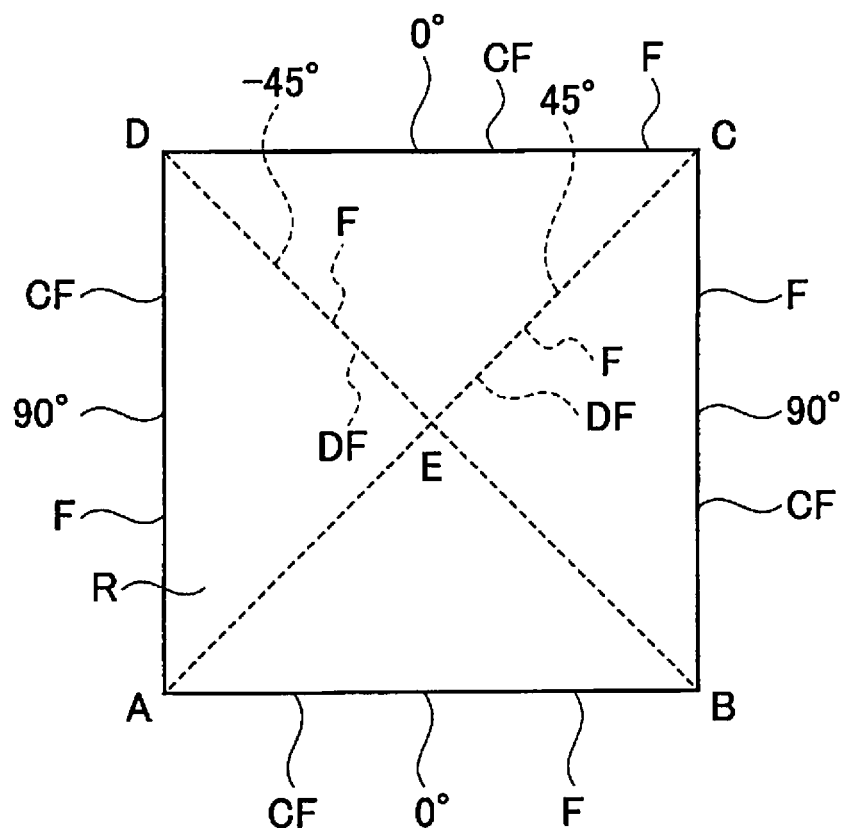
FIG. 2 is a diagram for explaining pattern elements of the first embodiment.

First, for the sake of convenience, two-dimensionally oriented "pattern elements" of the reinforcing fibers F are defined. FIG. 2 is a diagram for explaining pattern elements that are defined from the reinforcing fibers F that are oriented at four orientation angles (0°/45°/90°/−45°). In the figure, the broken lines also represent the discontinuous fibers DF, whereas the solid lines represent the continuous fibers CF. If any three of the four orientation angles (0°/45°/90°/−45°) are selected, two triangular pattern elements can be defined for each combination of the selected orientation angles. For example, if 0°/45°/90° are selected, triangle ABC and triangle ACD can be defined as pattern elements. In addition, if 0°/45°/−45° are selected, triangle ABE and triangle CDE can be defined as pattern elements. Similarly, triangles ABD, BCD, BCE, and ADE can be defined as other pattern elements. That is, the simplest shape of a pattern element defined from the two-dimensionally oriented reinforcing fibers F is a triangle in which the reinforcing fibers F of the selected three orientation angles are the sides, and the points at which the reinforcing fibers F intersect are the apices.

Figure 3:
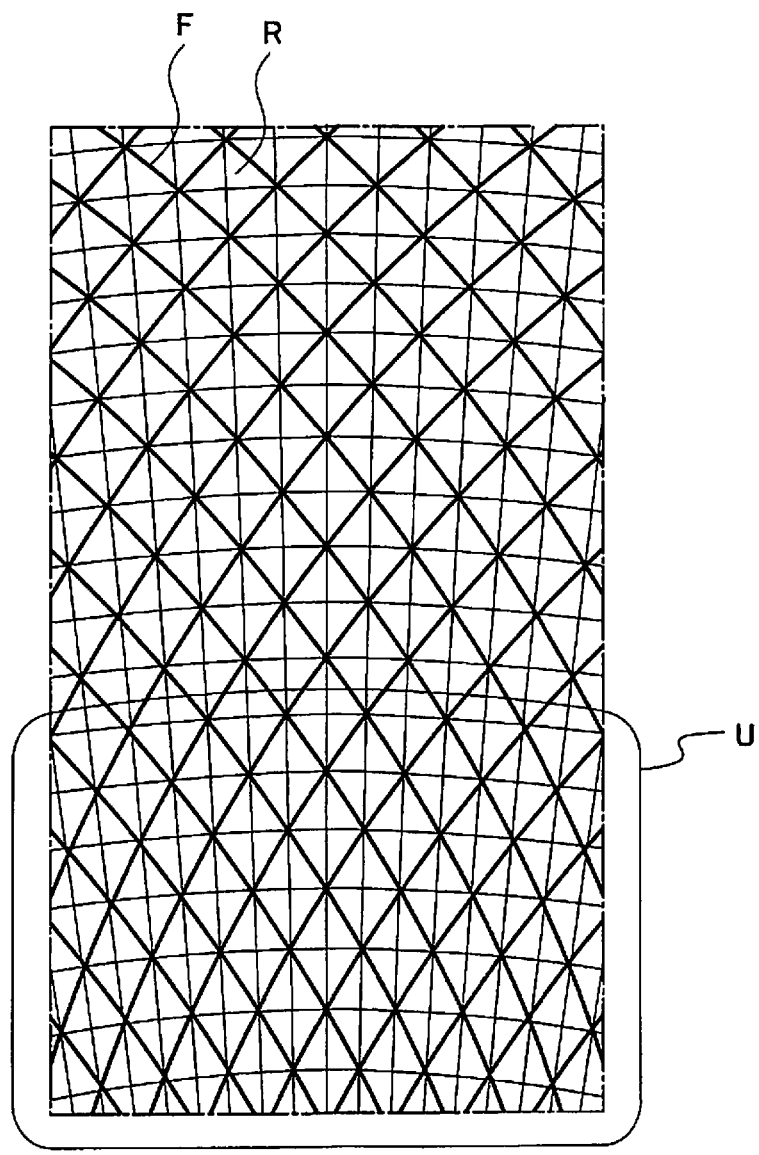
FIG. 3 is a diagram showing a state in which pattern elements have undergone shearing deformation.
Figure 4:
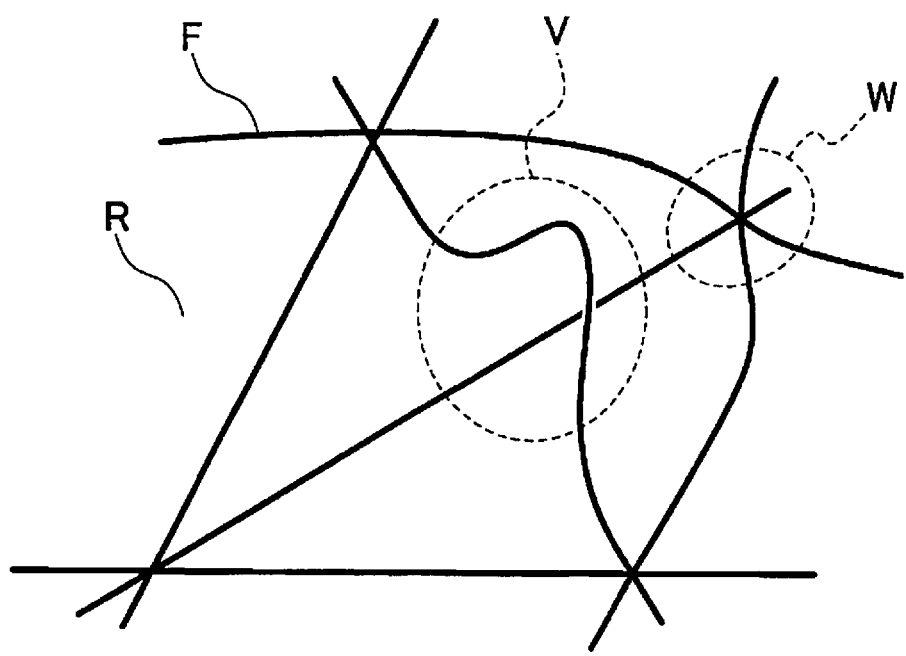
FIG. 4 is a diagram for explaining factors that deteriorate the appearance of a molded article.

(1) When a base material (comparative example), in which the reinforcing fibers F that are oriented at four orientation angles are all continuous fibers CF, is shaped into a three-dimensional form, each pattern element attempts to undergo shearing deformation in a plane parallel to the orientation of the reinforcing fibers F, as shown in FIG. 3 (particularly the U portion). In this deformed portion, the sizes of the angles of the triangle change, and a compressive force or a tensile force is generated at the reinforcing fibers F that constitute the sides of the triangle. Therefore, when the shearing deformation exceeds a certain limit, there is the possibility that the reinforcing fibers F will buckle due to the compressive force (refer to the V portion in FIG. 4), or that wrinkles will occur on the surface of the base material due to the tensile force (refer to the W portion in FIG. 4), thereby deteriorating the appearance of the molded article, as shown in FIG. 4.

In the present embodiment, on the other hand, certain reinforcing fibers F, the continuous fibers CF, are oriented at two of four orientation angles (0°/90°), and certain reinforcing fibers F, the discontinuous fibers DF, are oriented at the other two orientation angles (45°/−45°). Therefore, in any triangle of pattern elements, at least one side is composed of the discontinuous fibers DF. With regard to the discontinuous fibers DF, the divided fibers can move relative to each other in the fiber direction, so that axial forces (compressive force or tensile force) are less transmittable compared with the continuous fibers CF. Thus, when the pattern elements undergo in-plane shearing deformation, the forces that act on the continuous fibers CF via the apices of the triangles, i.e., the point of intersection with the discontinuous fibers DF, are reduced. Therefore, the axial forces that are generated in the reinforcing fibers F when the base material M1 is shaped into a three-dimensional form during molding are reduced, thereby preventing the reinforcing fibers F from buckling or forming wrinkles on the surface of the base material M1. As a result, the deterioration of the appearance of the molded article is suppressed. In addition, as a result of the reduction of axial forces that are generated in the reinforcing fibers F, the forces that restrain in-plane shearing deformation of the pattern elements are reduced, so that the shaping property of the base material M1 is improved.

(2) Further, in the present embodiment, the reinforcing fibers F oriented at two of the four orientation angles are continuous fibers CF and the reinforcing fibers F oriented at the other orientation angles are discontinuous fibers DF. Therefore, compared to a case in which only the reinforcing fibers F oriented in one orientation angle (for example, 0°) are continuous fibers CF, the tensile strength of the molded article obtained by molding the base material M1 is improved. In addition, since the difference between the orientation angles of the continuous fibers CF is 90° and the absolute value of the difference is within the range of 85° or more and 95° or less, compared to a case in which the absolute value of the difference is outside of this range, the isotropic mechanical properties of the molded article are improved.

(3) Moreover, in the present embodiment, the reinforcing fibers F that are the discontinuous fibers DF are aligned in a direction corresponding to each of the orientation angles and, together with the resin R, form a layer that does not intersect the reinforcing fibers F that are the continuous fibers CF. Therefore, compared to a case in which the layer of the discontinuous fibers DF intersects with the continuous fibers CF (for example, a case in which cuts are made only in the warp or the weft of a biaxial woven prepreg and used as the discontinuous fibers DF), each of the discontinuous fibers DF can more easily move in the fiber direction. Therefore, the force that acts on the continuous fibers CF from the discontinuous fibers DF is further reduced, thereby further improving the shaping property of the base material M1.

(4) Further, in the present embodiment, the reinforcing fibers F that are the discontinuous fibers DF oriented at mutually different orientation angles each form a different layer. That is, the discontinuous fibers DF are arranged in different layers for each orientation angle. Therefore, compared to a case in which discontinuous fibers DF having different orientation angles are arranged in the same layer (for example, when cuts are made in both the warp and weft of a biaxial woven prepreg and used as the discontinuous fibers DF), each of the discontinuous fibers DF can more easily move in the fiber direction. Therefore, the shaping property of the base material M1 is further improved.

In the first embodiment, the continuous fibers CF are oriented at 0°/90° and the discontinuous fibers DF are oriented at 45°/−45°, but the ways in which the orientation angles of the continuous fibers CF and the discontinuous fibers DF can be combined are not limited in this manner. For example, as shown in patterns P1 to P10 in FIG. 5, the reinforcing fibers F oriented at any one or two of the four orientation angles may be the continuous fibers CF, and the reinforcing fibers F oriented at orientation angles other than the aforementioned one or two orientation angles may be the discontinuous fibers DF. In FIG. 5, "CF" represents the continuous fibers CF and "DF" represents the discontinuous fibers DF. The first column of the "pattern elements" column exemplifies the pattern element of triangle ABC in FIG. 2, and the second to fourth columns respectively exemplify the pattern elements of triangles ABD, ABE, and ADE. As is clear from FIG. 5, in all of the patterns P1 to P10, at least one side of any triangle of any pattern element is composed of the discontinuous fibers DF, so that the effect described above can be obtained. Pattern P2 in the figure corresponds to the first embodiment.

Second Embodiment

A base material M2 according to a second embodiment will be described with reference to FIGS. 6 and 7. In the second embodiment, configurations that are different from those of the first embodiment will be described, while configurations having the same functions as the configurations already described have been assigned similar reference symbols, and the descriptions thereof have been omitted.

Figure 6:
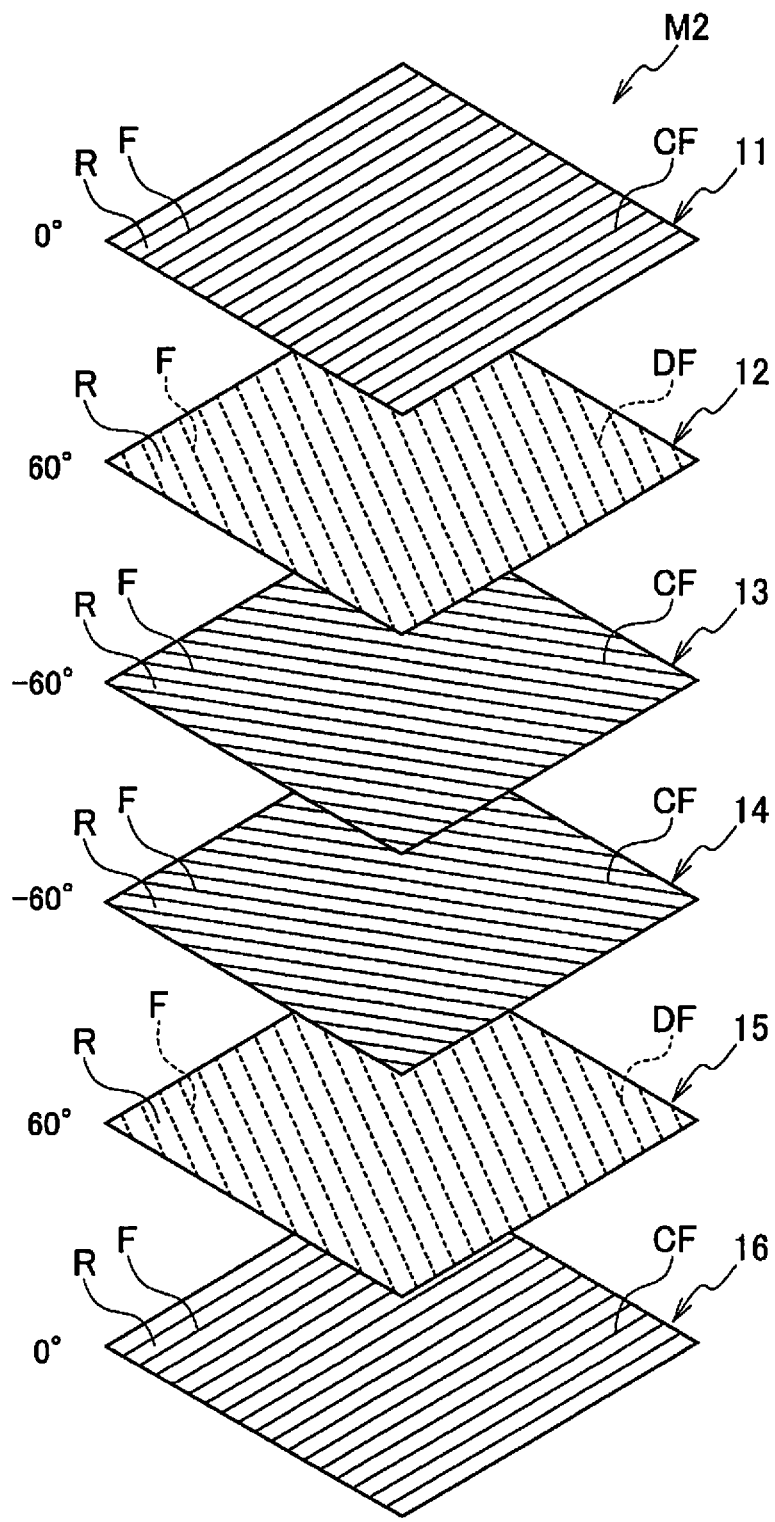
FIG. 6 is an exploded perspective view of a base material for molding according to a second embodiment.
Figure 7:
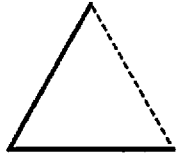
FIG. 7 is a diagram showing pattern elements of the second embodiment and modified examples thereof.
Figure 7:
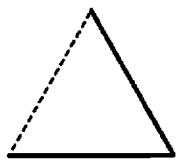
Figure 7:
Figure 7:
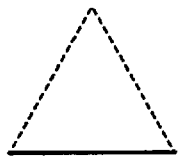
Figure 7:
Figure 7:

As shown in FIG. 6, the base material M2 for molding according to the second embodiment can be formed by laminating, for example, six prepregs, 11-16.

As shown in FIG. 6, the six prepregs 11-16 are laminated such that the reinforcing fibers F in prepregs 11-16 are oriented at three different orientation angles. For example, prepregs 11-16 can be laminated such that the reinforcing fibers F are oriented at orientation angles of 0°/60°/−60°/−60°/60°/0°, in order from the top in FIG. 6, so that the molded article obtained from the base material M2 has isotropic strength in the planar direction.

As shown in FIG. 6, in the present embodiment, of the three orientation angles, the reinforcing fibers F oriented at the orientation angles of 0°/−60° are continuous fibers CF. In addition, of the three orientation angles, the reinforcing fibers F oriented at orientation angles other than 0°/−60°, i.e., at 60°, are discontinuous fibers DF. The broken lines in FIG. 6 represent the discontinuous fibers DF, whereas the solid lines represent the continuous fibers CF.

Also, in the present embodiment, the reinforcing fibers F that are the discontinuous fibers DF may be aligned in a direction that corresponds to each of the orientation angles and form, together with the resin R, a layer that does not intersect the reinforcing fibers F that are the continuous fibers CF. For example, as shown in FIG. 6, the discontinuous fibers DF in the prepregs 12, 15 of the second and fifth layers may form a layer that does not intersect the continuous fibers CF in the prepregs 11, 13, 14, 16 of the first, third, fourth, and sixth layers. In addition, the reinforcing fibers F that are the discontinuous fibers DF oriented at mutually different orientation angles may each form a different layer. For example, as shown in FIG. 6, the discontinuous fibers DF in the prepreg 12 of the second layer may form a layer different than the discontinuous fibers DF in the prepreg 14 of the fourth layer.

The action and effect of the present embodiment will be described below. In the present embodiment, an equilateral triangle pattern element can be defined from the reinforcing fibers F oriented in three orientation angles (0°/60°/−60°).

In the present embodiment, the reinforcing fibers F oriented at two of the three orientation angles (0°/−60°) are continuous fibers CF and the reinforcing fibers F oriented at the other orientation angle (60°) are discontinuous fibers DF. Therefore, at least one side of the triangle of the pattern element is composed of the discontinuous fibers DF. Therefore, the effect of (1) above can also be obtained in this embodiment.

In addition, in the present embodiment, the reinforcing fibers F that are the discontinuous fibers DF are aligned in a direction that correspond to each of the orientation angles and form, together with the resin R, a layer that does not intersect the reinforcing fibers F that are the continuous fibers CF. Further, the reinforcing fibers F that are the discontinuous fibers DF oriented at mutually different orientation angles each form a different layer. Therefore, the effects of (3) and (4) above can also be obtained in this embodiment.

In the second embodiment, the continuous fibers CF are oriented at 0°/−60° and the discontinuous fibers DF are oriented at 60°, but the ways in which the orientation angles of the continuous fibers CF and the discontinuous fibers DF can be combined are not limited in this manner. For example, as shown by patterns P11 to P16 in FIG. 7, the reinforcing fibers F oriented at one or two of the three orientation angles may be the continuous fibers CF, and the reinforcing fibers F oriented at orientation angles other than the aforementioned one or two orientation angles may be the discontinuous fibers DF. In FIG. 7, "CF" represents the continuous fibers CF and "DF" represents the discontinuous fibers DF. The "pattern element" column exemplifies each pattern element of patterns P11 to P16. As is clear from FIG. 7, in all of the patterns P11 to P16, at least one side of any triangle of any pattern element is composed of the discontinuous fibers DF, so that the effect described above can be obtained. Pattern P12 in the figure corresponds to the second embodiment.

In the foregoing description, "two-dimensionally oriented reinforcing fibers F" means the reinforcing fibers F oriented in the planar direction of the base material. Reinforcing fibers oriented in the thickness direction of the base material and randomly oriented reinforcing fibers are not included in the "two-dimensionally oriented reinforcing fibers F." The form of the "two-dimensionally oriented reinforcing fibers F" is not particularly limited, and includes cases in which reinforcing fibers F that extend in the planar direction are interlaced with each other, such as biaxial woven fabric and triaxial woven fabric, in addition to those in which the reinforcing fibers F are aligned in one direction and arranged in the form of a sheet as described above. Therefore, the form of the reinforcing fibers F in one or more layers of the base materials M1, M2 according to the embodiments and modified example described above may be a biaxial woven fabric or a triaxial woven fabric. Examples of biaxial woven fabric include woven fabrics woven by means of a method such as plain weave, twill weave, and satin weave.

In addition, the order of the orientation angles of the reinforcing fibers F of each layer of the base materials M1, M2 is not limited to those of the embodiments and the modified example. For example, in the first embodiment, the order was 0°/45°/90°/−45°/−45°/90°/45°/0° from the top down in FIG. 1, but it may be 45°/−45°/0°/90°/90°/−45°/45°. Further, the number of layers or the number of prepregs of the base materials M1, M2 is not particularly limited to the foregoing. Moreover, each layer of the base materials M1, M2 may be laminated such that the molded article has anisotropic strength in the planar direction. Further, a combination of two or more of the patterns P1-P16 shown in FIGS. 5 and 7 may be used.

Several embodiments and modified examples were described above, but these embodiments, etc., are merely examples described in order to facilitate comprehension of the invention. The technical scope of the invention is not limited to the specific technical matters disclosed in the above-described embodiments, etc., and includes various modifications, changes, and alternatives that can be easily derived therefrom.

INDUSTRIAL APPLICABILITY

The base materials M1, M2 for molding can be shaped into molded articles having the desired three-dimensional form. The obtained molded article can be applied to vehicular components, such as those for automobiles, for example, hoods, floor panels, door panels, bumpers, trunk lids, rear gates, fender panels, side body panels, and roof panels. In addition, the molded article can be utilized as component members of transport vehicles, such as those for aircraft, ships, railcars, etc., domestic electric appliances, power generation facilities, production machines, housing equipment, furniture, leisure goods, etc.

The invention claimed is:

1. A base material for molding comprising:
   a plurality of reinforcing fibers that are two-dimensionally oriented; and a resin impregnated with the reinforcing fibers, the reinforcing fibers being oriented at three or more different orientation angles, the reinforcing fibers including a plurality of first reinforcing fibers oriented at one orientation angle or two orientation angles among the three or more different orientation angles, the first reinforcing fibers being continuous fibers, the reinforcing fibers including a plurality of second reinforcing fibers oriented at orientation angles other than the one orientation angle or the two orientation angles, the second reinforcing fibers being discontinuous fibers, and the second reinforcing fibers being in a divided state in the base material for molding.

2. The base material for molding according to claim 1, wherein the first reinforcing fibers are oriented at the two orientation angles, the second reinforcing fibers are oriented at orientation angles other than the two orientation angles, and an absolute value of a difference between the two orientation angles is between 85° and 95°, inclusive.

3. The base material for molding according to claim 1, wherein the second reinforcing fibers are aligned in directions that correspond to each of the orientation angles other than the one orientation angle or the two orientation angles, and together with the resin, the second reinforcing fibers form at least one layer that does not intersect the first reinforcing fibers.

4. The base material for molding according to claim 3, wherein the at least one layer includes a plurality of layers, and the second reinforcing fibers oriented at mutually different orientation angles are included in different layers among the plurality layers.

* * * * *